(12) United States Patent
Mula et al.

(10) Patent No.: US 11,888,753 B2
(45) Date of Patent: Jan. 30, 2024

(54) ETHERNET PAUSE AGGREGATION FOR A RELAY DEVICE

(71) Applicant: MELLANOX TECHNOLOGIES, LTD., Yokneam (IL)

(72) Inventors: Liron Mula, Hertzlia (IL); Zachy Haramaty, Hemed (IL); Shachar Bar Tikva, Petah Tikva (IL); Dekel Dadon, Ramat-Gan (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 17/398,677

(22) Filed: Aug. 10, 2021

(65) Prior Publication Data

US 2023/0047454 A1    Feb. 16, 2023

(51) Int. Cl.
*H04L 12/823* (2013.01)
*H04L 47/32* (2022.01)
*H04L 47/30* (2022.01)

(52) U.S. Cl.
CPC .............. *H04L 47/32* (2013.01); *H04L 47/30* (2013.01)

(58) Field of Classification Search
CPC ....... H04L 47/266; H04L 47/30; H04L 47/32; H04L 47/10; H04L 47/12; H04L 47/18; H04L 47/29; H04L 47/6255; H04L 2012/5682; H04L 2012/5681; H04L 49/9084; H04L 49/90
See application file for complete search history.

(56) References Cited

U.S. PATENT DOCUMENTS

| | | | | |
|---|---|---|---|---|
| 7,930,341 B1* | 4/2011 | Chayat | .................... | H04L 49/90 709/217 |
| 7,948,883 B1* | 5/2011 | Croft, Jr. | ............. | H04L 12/2801 725/111 |
| 8,910,168 B2* | 12/2014 | Mital | .................... | H04L 49/109 718/101 |
| 9,871,608 B1* | 1/2018 | Chang | ...................... | H04Q 9/00 |
| 9,929,829 B1* | 3/2018 | Huang | .................... | H04L 47/30 |
| 10,129,153 B2* | 11/2018 | Caulfield | ................ | H04L 47/10 |
| 10,505,851 B1* | 12/2019 | Matthews | ........... | H04L 47/6255 |
| 2005/0182848 A1* | 8/2005 | McNeil | .................... | H04L 47/17 709/236 |

(Continued)

OTHER PUBLICATIONS

Extended European Search Report for Europe Patent Application No. 22189611.1, dated Dec. 9, 2022, 11 pages.

*Primary Examiner* — Wutchung Chu
(74) *Attorney, Agent, or Firm* — Sheridan Ross P.C.

(57) ABSTRACT

A relay device is provided that may identify a quantity of empty data byte locations in a data buffer of the relay device. The relay device may receive an indicator associated with transmitting data packets. The relay device may pause or enable a lossless flow of data between the relay device, a host device, and a peer device based on the quantity of empty data byte locations, the indicator, or both. The relay device may include a first data interface coupled with a peer device, a second data interface coupled with a host device, a data buffer configured to store data packets received from the host device, and a state machine that enables a lossless transmission of data between the host device and peer device. The state machine may transmit a pause frame to the host device based on a data buffer utilization reaching a data storage capacity.

25 Claims, 4 Drawing Sheets

(56) References Cited

U.S. PATENT DOCUMENTS

| | | | |
|---|---|---|---|
| 2006/0092837 A1* | 5/2006 | Kwan | H04L 47/266 370/468 |
| 2006/0198389 A1* | 9/2006 | Eriokson | H04L 47/10 370/469 |
| 2007/0206496 A1* | 9/2007 | Roy | G06F 13/4059 370/229 |
| 2008/0259798 A1* | 10/2008 | Loh | H04L 47/125 370/235 |
| 2010/0165846 A1* | 7/2010 | Yamaguchi | H04B 7/15592 370/236 |
| 2012/0014253 A1* | 1/2012 | Rongong | H04L 49/506 370/242 |
| 2012/0063493 A1* | 3/2012 | Hasegawa | H04L 47/724 375/296 |
| 2013/0250762 A1* | 9/2013 | Assarpour | H04L 49/506 370/235 |
| 2014/0086054 A1* | 3/2014 | Rongong | H04L 49/35 370/235 |
| 2014/0146666 A1* | 5/2014 | Kwan | H04L 47/12 370/230 |
| 2014/0369194 A1* | 12/2014 | Friedman | H04L 47/245 370/235 |
| 2015/0109928 A1* | 4/2015 | Yang | H04L 47/627 370/235 |
| 2015/0249529 A1* | 9/2015 | Zheng | H04L 1/1685 370/336 |
| 2015/0263994 A1* | 9/2015 | Haramaty | H04L 49/3036 370/412 |
| 2016/0330788 A1* | 11/2016 | Zheng | H04W 28/0205 |
| 2017/0279741 A1* | 9/2017 | Elias | H04L 43/16 |
| 2019/0173793 A1* | 6/2019 | Liu | H04L 47/12 |
| 2020/0106710 A1* | 4/2020 | Ryoo | H04L 49/252 |
| 2020/0136985 A1* | 4/2020 | Sampathkumar | H04L 49/3018 |
| 2020/0396167 A1* | 12/2020 | Taheri | H04L 47/30 |
| 2022/0210673 A1* | 6/2022 | Koshiji | H04W 72/20 |

* cited by examiner

ETHERNET PAUSE AGGREGATION FOR A RELAY DEVICE

FIELD OF TECHNOLOGY

The following relates to media access control, including Ethernet pause aggregation.

BACKGROUND

In some data packet networks, a relay device (e.g., a Media Access Control Security (MACsec) device, an Internet Protocol Security (IPsec) device, a tunneling device) may be configured to relay data packets between a host device and a peer device. Some relay devices may be equipped with a data buffer for storing incoming data packets received from the host device until the data packets have been successfully encrypted and relayed to the peer device.

SUMMARY

The described techniques relate to improved methods, systems, devices, and apparatuses that support Ethernet pause aggregation for a relay device. Generally, the described techniques provide for media access control.

A method for flow control in a network is provided that includes: identifying, by a device, a quantity of empty data byte locations in a data buffer of the device; receiving an indicator associated with transmitting data packets; identifying a state of a state machine included in the device, where the state of the state machine may be based on the indicator; and pausing a lossless flow of data between the device and at least two other devices. Pausing the lossless flow of data may be based on the quantity of empty data byte locations being below a threshold, the state of the state machine, or both.

A device is provided that includes: a processor; memory in electronic communication with the processor; and instructions stored in the memory, the instructions being executable by the processor to: identify, by the device, a quantity of empty data byte locations in a data buffer of the device; receive an indicator associated with transmitting data packets; identify a state of a state machine included in the device, where the state of the state machine is based on the indicator; and pause a lossless flow of data between the device and at least two other devices. Pausing the lossless flow of data may be based on the quantity of empty data byte locations being below a threshold, the state of the state machine, or both.

A system is provided that includes: a data buffer; a controller, where the controller is configured to identify a quantity of empty data byte locations in the data buffer; a transceiver, where the transceiver is configured to receive an indicator associated with transmitting data packets; and a state machine configured to transition among a set of states based on the indicator. The controller is further configured to pause a lossless flow of data between the data buffer and at least two devices, where pausing the lossless flow of data may be based on the quantity of empty data byte locations being below a threshold, the state of the state machine, or both Examples may include one of the following features, or any combination thereof.

Some examples of the method, apparatus, and system described herein may include enabling the lossless flow of data between the device and the at least two other devices, where enabling the lossless flow of data may be based on the quantity of empty data byte locations exceeding the threshold, the state of the state machine, or both.

In some examples of the method, apparatus, and system described herein, pausing the lossless flow of data based on the quantity of empty data byte locations may be regardless of the state of the state machine; enabling the lossless flow of data based on the quantity of empty data byte locations may be regardless of the state of the state machine; or both.

In some examples of the method, apparatus, and system described herein, pausing the lossless flow of data may be based on a first state associated with the state machine; and enabling the lossless flow of data may be based on a second state associated with the state machine.

Some examples of the method, apparatus, and system described herein may include transmitting a pause request based on the quantity of empty data byte locations being below a threshold, the state of the state machine, or both. In some examples, the pause request, the indicator, or both may include a control frame.

Some examples of the method, apparatus, and system described herein may include transmitting an enable request based on the quantity of empty data byte locations exceeding a threshold, the state of the state machine, or both. In some examples, the enable request, the indicator, or both may include a control frame.

Some examples of the method, apparatus, and system described herein may include receiving a set of data packets; and storing the set of data packets to the data buffer, where identifying the quantity of empty data byte locations may be based on storing the set of data packets.

In some examples of the method, apparatus, and system described herein, receiving the set of data packets, storing the set of data packets, or both may include refraining from discarding one or more data packets of the set of data packets.

Some examples of the method, apparatus, and system described herein may include transmitting at least a subset of the set of data packets over a communication medium based on the state of the state machine, where identifying the quantity of empty data byte locations may be based on transmitting at least the subset of the set of data packets.

In some examples of the method, apparatus, and system described herein, the communication medium may include a physical medium electrically coupling the device and a first device of the at least two other devices.

Some examples of the method, apparatus, and system described herein may include determining a size of the data buffer based on one or more of: an interface bandwidth associated with the communication medium; a distance between the device and the first device; and a transmission speed associated with the communication medium.

In some examples of the method, apparatus, and system described herein, the device may include a relay device.

In some examples of the method, apparatus, and system described herein, the at least two other devices may include a host device and a peer device.

In some examples of the method, apparatus, and system described herein, the network may include a local area network.

A relay device is provided that includes: a first data interface coupled with a peer device; a second data interface coupled with a host device; a data buffer that is configured to store data packets received from the host device prior to transmitting the data packets to the peer device; and a state machine that enables a lossless transmission of data between the host device and peer device. The relay device may transmit a pause frame to the host device based on a data buffer utilization reaching a data storage capacity.

Examples may include one of the following features, or any combination thereof.

In some examples of the method, apparatus, and system described herein, the state machine may be further configured to transmit the pause frame to the host device in response to receiving an additional pause frame from the peer device.

In some examples of the method, apparatus, and system described herein, the data buffer may include a First-In-First-Out data buffer.

In some examples of the method, apparatus, and system described herein, the data packets may be received at more than 400 G/sec and the data buffer may include a capacity of no more than 50 kb.

In some examples of the method, apparatus, and system described herein, the data buffer may include a capacity of no more than 25 kb.

In some examples of the method, apparatus, and system described herein, a data cable connects the first data interface with the peer device and where a line trace connects the second data interface with the host device.

In some examples of the method, apparatus, and system described herein, the data cable may be at least 5 m in length.

In some examples of the method, apparatus, and system described herein, the first data interface may include at least one of a PCI Express (PCIe) interface and an Ethernet interface.

In some examples of the method, apparatus, and system described herein, the state machine may be further configured to transmit a start transmission command to the host device in response to the data buffer utilization falling below a predetermined threshold.

DETAILED DESCRIPTION

Figure 1:
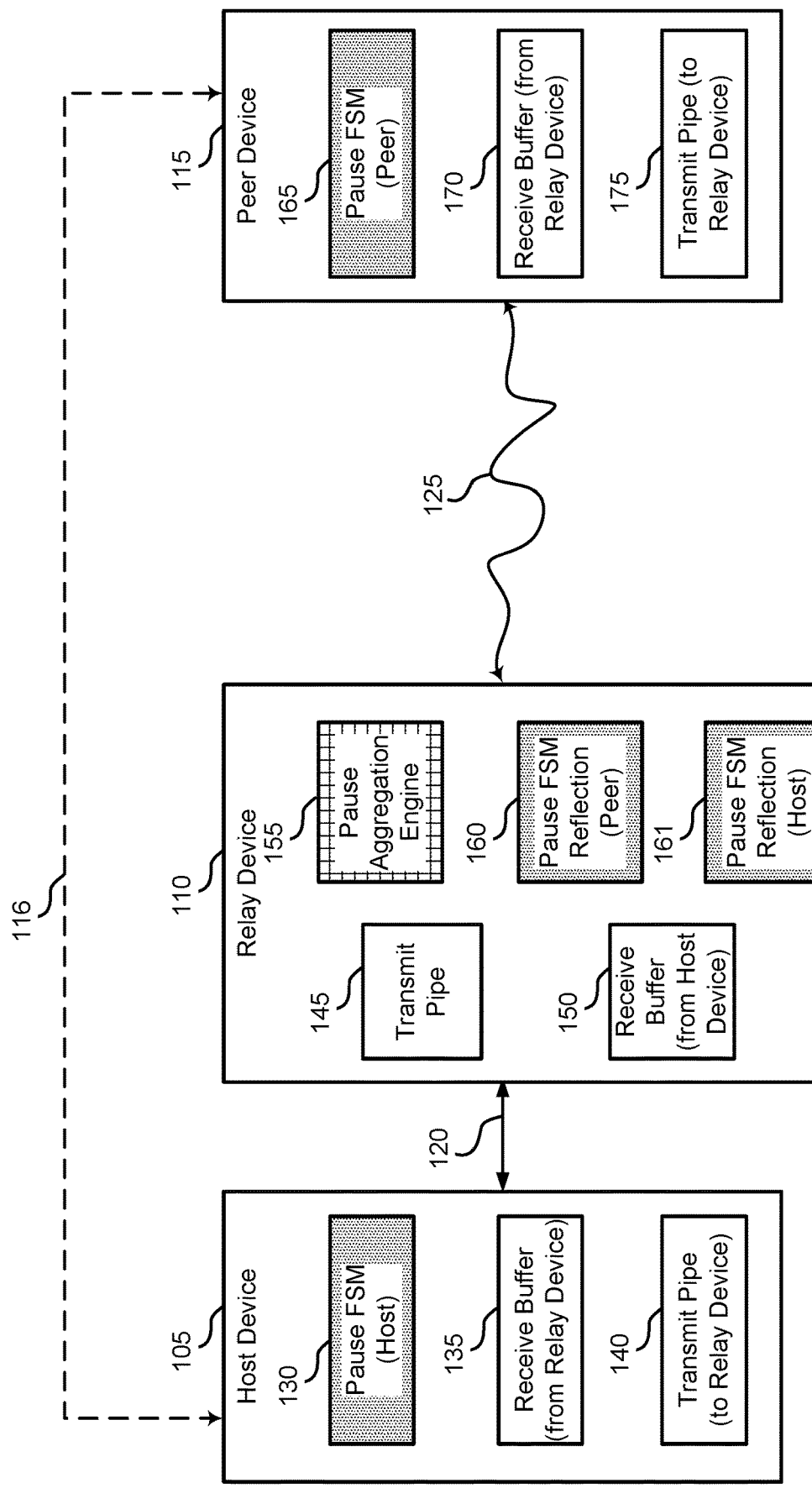
FIG. 1 illustrates an example of a system that supports Ethernet pause aggregation for a relay device in accordance with aspects of the present disclosure.

In some networks, a Media Access Control Security (MACsec) engine (also referred to herein as a relay component) may be configured to relay data packets between a host device and a peer device. A MACsec engine may be implemented in, for example, a relay device electrically coupled between the host device and the peer device. In some examples, a MACsec engine may move or transfer data from ingress-to-egress. In some cases, a MACsec engine may change the packet size of the data packets (e.g., due to encryption processes, signal processing, etc. performed on the data packets) prior to relaying or transferring the data packets. For example, input bandwidth at a MACsec engine may be different from output bandwidth. Some other examples of relay devices include an Internet protocol security (IPsec) device or a tunneling device.

Some relay devices may be equipped with a data buffer for storing incoming data packets received from the host device until the data packets have been successfully encrypted and relayed to the peer device. In some cases, relay devices may be equipped with a data buffer for storing incoming data packets received from the host device (e.g., via a host side of the relay device) until the data packets have been successfully encrypted and relayed to the peer device (e.g., via a line side of the relay device). For lossless operation, a relay device may be equipped with a data buffer (also referred to herein as a hold buffer or a receive buffer) and a state machine for stopping the data flow of data packets at both the host side and the line side of the relay device. In some cases, the host side of the relay device may be electrically coupled to the host device via a relatively short communications link, and the line side of the relay device may be electrically coupled to the peer device via a relatively longer communications link.

In some cases, to ensure lossless operation between a host device (also referred to herein as a sender) to a peer device (also referred to herein as a receiver), packet buffers may be incorporated into network equipment (e.g., host devices, relay devices, peer devices). In some examples, the size of the packet buffer at a relay device may be equal to the round trip time (RTT) between the relay device and the peer device. However, conditions such as path blockage and congestion along a communication medium (e.g., the line) between the MACsec engine and the peer device may lead to an increase in lost transmissions and retransmissions, thereby increasing the amount of data to be stored in the data buffer of a relay device. In some cases, reduced data rates/transmission speeds associated with the communication medium may contribute to a reduced output bandwidth (e.g., at the line side) at the MACsec engine compared to input bandwidth (e.g., at the host side), which may further increase the amount of data to be stored in the data buffer. In some other cases, the rate at which the MACsec engine can process and relay data traffic to the peer device may be based on transmission speeds associated with the communication medium between the MACsec engine and the peer device, and the rate may be slower than the rate at which data traffic is transferred to the MACsec engine from the host device.

In some data packet networks, when a relay device is added to a channel (e.g., from a host device to a peer device via the relay device) and lossless operation is required, some conditions (e.g., path blockage, congestion, reduced data rates) between the relay device and the peer device may prevent the relay device from acting as a wire. That is, for example, some implementations may scale the data buffer of the relay device based on the RTT between the relay device and the peer device in order to ensure a lossless mode of operation between the devices. Accordingly, in some cases, some relay devices may be equipped with a relatively large data buffer for storing incoming data packets so as to reduce the possibility of discarded packets. However, such techniques may be unattainable due to overhead (e.g., cost, device size, etc.).

In some data packet networks, for example, the relay device forwards packets from a host device to a peer device with some inefficiency (e.g., due to path blockage, data rates, etc. as described herein). Accordingly, in some cases, the amount of data stored in the data buffer (e.g., host-side buffer) of the relay device may reach the data storage capacity of the data buffer. Some techniques may address such data storage capacities by terminating lossless mode of operation at the relay device (e.g., lossless operation between the host device and the relay device in combination with lossless operation between the relay device and the peer device). For example, the host device may request (e.g., via a command) the relay device to stop transmitting data packets to the host device (e.g., stop relaying data packets from the peer device to the host device), and the relay device may absorb the incoming traffic from the peer device. However, absorbing traffic from at the relay device (e.g., traffic from the peer device) may be associated with a high cost overhead, as the communication medium (e.g., the line) between the relay device and the peer device may be relatively long (e.g., 100 meters). That is, for example, the amount of existing data packets being transmitted over the communication medium (and to be stored at the relay device) may be relatively large due to the relatively large RTT associated with the communication medium.

Aspects described herein support lossless mode operations at a relay device including a MACsec engine. For example, the relay device may support lossless data transmissions between a host device and a peer device, via the relay device. The relay device may include a state machine (e.g., a pause-reflection state machine) for enabling and/or disabling a flow of data from the host device to the peer device based on a set of criteria. In some examples, by enabling and/or disabling the flow of data, the relay device may control data flow at a data buffer for forwarding data packets from the host device to a peer device, thereby preventing data loss. For example, controlling the data flow may prevent the amount of incoming data from exceeding the buffer capacity.

The data buffer storing packets flowing from the host device to the peer device may be referred to as a 'host-side buffer,' a 'host-side data buffer,' or a 'relay unit packet buffer' of the relay device. In some cases, for complete lossless termination, the host-side buffer may be sized according to the RTT between the host device and the relay device. For example, the RTT between the host device and the relay device may correspond to a relatively short (e.g., 3 inches) communication medium between the host device and the relay device. For example, the host-side buffer may store data packets coming from the host device (and targeted to the peer device), and the size of the host-side buffer may be relatively small (e.g., accommodating for the relatively small RTT between the host device and the relay device).

The relay device may include another state machine for enabling and/or disabling a flow of data from the peer device to the host device based on a set of criteria. In some examples, by enabling and/or disabling the flow of data, the relay device may control data flow at a data buffer (also referred to herein as a 'line-side buffer,' a line-side data buffer,' or a 'peer-side buffer') for forwarding data packets from the peer device to the host device, thereby preventing data loss. For example, controlling the data flow may prevent the amount of incoming data from exceeding the buffer capacity.

In some cases, for complete lossless termination, the line-side data buffer may be sized according to the RTT between the relay device and the peer device. For example, the RTT between the relay device and the peer device may correspond to a relatively long (e.g., 100 meters) communication medium between the relay device and the peer device. In an example, the line-side data buffer may store data packets coming from the peer device (and targeted to the host device), and the size of the line-side data buffer may be relatively large (e.g., accommodating for the relatively large RTT between the relay device and the peer device).

Aspects of the present disclosure described herein may support reducing the size of the line-side buffer under example conditions (e.g., assumptions) in which any bandwidth (e.g., data packets) sent by the peer device can be forwarded, via the relay device, to the host device. In such an example, the relay device and/or the host device (e.g., via the relay device) may refrain from generating and sending pause packets to the peer device.

In another example, aspects of the disclosure may support reducing the size of the line-side buffer under example conditions (e.g., assumptions) in which no bandwidth (e.g., data packets) sent by the host device may be forwarded to the peer device. In such an example, the relay device and/or the peer device (e.g., via the relay device) may generate and send pause packets to the host device.

A relay device described herein may support receiving pause requests from a peer device and forwarding the pause requests to a host device. In some aspects, by forwarding the pause requests to the host device, the relay device may stop or pause the flow of traffic to the peer device (e.g., by requesting the host device to stop sending data packets). In some cases, when the host-side buffer at the relay device exceeds a threshold (e.g., data capacity of the host-side buffer), the relay device may generate and transmit a pause request to the host device. In an example, from the perspective of the host device, the pause request may appear to originate from the peer device.

In an example, the aspects described herein may support a lossless mode of operation from the host device to the relay device and a lossless mode of operation from the relay device to the peer device. In another example, the example aspects may support a lossless mode of operation from the peer device to the host device, via the relay device. For example, the peer device may transmit a request (e.g., a pause frame) to the relay device to stop the data flow from the host device to the peer device, and the relay device may forward the request to the host device. Alternatively, or additionally, the host device may transmit a request (e.g., a pause frame) to the relay device to stop the data flow from the peer device to the host device, and the relay device may forward the request to the peer device.

In an example aspect, the relay device may control the data flow based on an amount of data (e.g., with respect to a threshold) in the data buffer of the relay device. For example, when the amount of data stored in the data buffer exceeds the threshold (e.g., due to data packets received from the host device, less data packets relayed to the peer device, due to differences in data-rates, etc.), the relay device may transmit a request (e.g., a pause frame) to the host device, requesting the host device to stop or pause data packet transmissions. In some cases, the relay device may control the data flow based on an indicator (e.g., a pause frame indicating 'do not send' data packets, a transmission command indicating to 'send' data packets) received from the peer device. For example, the relay device may observe for pause frames and/or transmission commands transmitted by the peer device. In an example, when the amount of data in the data buffer of the relay device is below a threshold (e.g., the relay buffer is empty), and the peer device is in an enable-transmission state (e.g., the relay device has received a transmission command from the peer device), the relay device may send a transmission command to the host device for starting or resuming data packet transmissions.

In some aspects, at the peer device, when the amount of data in the data buffer of the peer device is below the threshold (e.g., the data buffer is empty), the peer device may send a transmission command to the host (e.g., via the relay device) for starting or resuming data packet transmissions. In an example, the peer device may send the transmission command to the relay device. The relay device may forward the transmission command to the host device (or refrain from forwarding the transmission command) based on the buffer status of the relay device. For example, the relay device may forward the transmission command to the host device when the amount of data in the data buffer of the relay device is below a threshold (e.g., buffer status is empty). Alternatively, or additionally, the relay device may refrain from forwarding the transmission command to the host device when the amount of data is greater than or equal to the threshold (e.g., buffer status is full). The indication by the peer device (e.g., pause frame, transmission command) may be stored by the relay device.

The relay device may support a reduced buffer size (e.g., 25 kilobytes (kb), 50 kb) at the line side, thereby providing for reduced overhead (e.g., cost, device size). In some examples, aspects described herein may support removal of the data buffer at the line-side of a relay device, which may be advantageous over some other relay devices. For example, in a data packet network, the communication medium (e.g., the line) between a relay device and a peer device may be a switch-to-switch 100 meter trace. For some other relay devices, a relay device may include a relatively large data buffer at the line-side for absorbing all of the information/data packets for communication over the communication medium. Example aspects of the relay device described herein may be implemented in an Ethernet switch or an Ethernet gear box.

Aspects of the disclosure are initially described in the context of a data packet network. Examples of processes and signaling exchanges that support Ethernet pause aggregation for a relay device are then described. Aspects of the disclosure are further illustrated by and described with reference to apparatus diagrams, system diagrams, and flowcharts that relate to Ethernet pause aggregation for a relay device.

FIG. 1 illustrates an example of a system 100 that supports Ethernet pause aggregation for a relay device in accordance with aspects of the present disclosure. The system 100 may include, for example, a data packet network. In an example, the system 100 may include a host device 105, a relay device 110, and a peer device 115. The host device 105, relay device 110, and peer device 115 may be any electronic devices capable of connecting to a wireless or wired network.

The system 100 may support the communication of data packets between the host device 105 and the peer device 115, for example, via the relay device 110. In some aspects, the system 100 may implement aspects of flow control in a network, supportive of lossless transmission (e.g., avoiding dropped frames or data packets) between the host device 105, the relay device 110, and the peer device 115. For example, the system 100 may support enabling and/or stopping the flow of data packets at both the host side (e.g., a relatively short communications link, for example, communications link 120) and the line side (e.g., a relatively long communications link, for example, communications link 125) of the relay device 110.

The system 100 may support machine-to-machine communications between any of the host device 105, the peer device 115, and the relay device 110 over a network. In some aspects, the system 100 may support machine-to-machine communications between additional host devices 105, peer devices 115, and/or relay devices 110. Networks supported by the system 100 may include any type of known communication medium or collection of communication media, and such networks may use any type of protocols to transport messages between endpoints. The networks may include wired communications technologies, wireless communications technologies, or any combination thereof.

The Internet is an example of a network supported by the system 100, and the network may constitute an Internet Protocol (IP) network consisting of multiple computers, computing networks, and other devices (e.g., host devices 105, peer devices 115, and/or relay devices 110, etc.) located in multiple locations. Other examples of networks supported by the system 100 may include, without limitation, a standard Plain Old Telephone System (POTS), an Integrated Services Digital Network (ISDN), the Public Switched Telephone Network (PSTN), a Local Area Network (LAN), a Wide Area Network (WAN), a wireless LAN (WLAN), a Session Initiation Protocol (SIP) network, a Voice over Internet Protocol (VoIP) network, a cellular network, and any other type of packet-switched or circuit-switched network known in the art. In some cases, the system 100 may include of any combination of networks or network types. In some aspects, the networks may include any combination of communication mediums such as coaxial cable, copper cable/wire, fiber-optic cable, or antennas for communicating data (e.g., transmitting/receiving data).

The host device 105 and the relay device 110 may communicate via the communications link 120. In an example, the communications link 120 may be a line trace that connects (e.g., electrically couples) the host device 105 and the relay device 110. The communications link 120 may be connected to a data interface of the relay device 110.

The communications link 120 may be referred to as, for example, a metal line, transmission line, interconnect line, trace, wire, conductor, signal path, and/or signaling medium. For example, the communications link 120 may include any combination of conductive materials that provide signal paths for coupling or interconnecting electrical circuitry associated with the host device 105 and the relay device 110. The conductive materials may include, for example, aluminum (Al), copper (Cu), an alloy of Al and Cu, etc. In some other examples, the conductive materials may include other materials such as doped polysilicon, doped single-crystal silicon, titanium (Ti), molybdenum (Mo), etc.

The relay device 110 and the peer device 115 may communicate via the communications link 125. In an example, the communications link 125 may be a data cable that connects (e.g., electrically couples) the relay device 110 and the peer device 115. In some aspects, the communications link 125 may be a secure link and may be capable of communicating encrypted information. The communications link 125 may be connected to another data interface of the relay device 110. The data interface may be, for example, a PCIe interface, an Ethernet interface, etc.

The communications link 125 may include any combination of coaxial cable(s), fiber optic links, and/or switches. In an example, the communications link 125 may be an Ethernet cable. For example, the communications link 125 may be a full-duplex Ethernet link. In some cases, the communications link 125 may have a length of at least 5 meters. In some other examples, the communications link 125 may be a transmission medium including a wireless channel. For example, the relay device 110 may be a wired-to-wireless relay device.

The host device 105 may include a pause finite state machine (FSM) 130 (also referred to herein as a finite-state automaton, a finite automaton, or a state machine), a receive buffer 135 (also referred to herein as a data buffer), and a transmit pipe 140 (also referred to herein as a transmission pipeline). The pause FSM 130 may support flow control between the host device 105, the relay device 110, and the peer device 115. In some aspects, the pause FSM 130 may support flow control in both directions (e.g., from host device 105 to peer device 115, from peer device 115 to host device 105) over the communications link 120.

For example, the host device 105 may transmit pause frames and/or transmission commands to the peer device 115 indirectly via communications link 120 and communications link 125 (e.g., via the relay device 110). In some aspects, pause frames may be referred to herein as a pause messages or pause requests. In some other aspects, transmission commands may be referred to herein as a start transmission commands or an enable requests.

In an example, based on a state of the pause FSM 130, the host device 105 (the pause FSM 130) may output a pause frame for pausing transmissions (e.g., of data packets) by the peer device 115 for a specified period of time. In another example, based on a different state of the pause FSM 130, the host device 105 may transmit a transmission command to the peer device 115 for enabling or unpausing data packet transmissions by the peer device 115.

The receive buffer 135 may be, for example, a first-in-first-out (FIFO) data buffer. The host device 105 may store data packets received from the peer device 115 (e.g., received via the relay device 110). The transmit pipe 140 may be, for example, a data path including a set of logical connections, and the transmit pipe 140 may be compatible with a physical interface for PCIe Architecture (PIPE) specifications. The host device 105 may transmit data packets over the communications link 120, for example, via the transmit pipe 140.

In an example, based on an amount of data stored in the receive buffer 135 exceeding a threshold, the pause FSM 130 may enter a first state (e.g., a pause state), and the host device 105 (the pause FSM 130) may output the pause frame. In another example, based on an amount of data stored in the receive buffer 135 being less than a threshold, the pause FSM 130 may enter a second state (e.g., an unpause state), and the host device 105 (the pause FSM 130) may output a transmission command for starting or resuming data packet transmissions by the peer device 115. The host device 105 may process (e.g., using a processor included in the host device 105) data packets stored in the receive buffer 135, and the pause FSM 130 may enter the unpause state based on detecting the amount of data stored in the receive buffer 135 is less than the threshold.

In another example, the host device 105 may respond to pause frames received by the relay device 110. For example, the peer device 115 may transmit a pause frame to the relay device 110 over the communications link 125, and the relay device 110 may transmit a corresponding pause frame (or the same pause frame) to the host device 105 over the communications link 120. The host device 105 may pause transmissions (e.g., of data packets) via the transmit pipe 140 based on the pause frame. In an example, the pause frame may include a specified period of time for pausing data packet transmissions. The host device 105 may pause transmissions (e.g., of data packets) via the transmit pipe 140 based on the pause frame.

Alternatively, or additionally, the host device 105 may respond to transmission commands received from the relay device 110. For example, the peer device 115 may transmit a transmission command (also referred to herein as a start transmission command) to the relay device 110 over the communications link 125, and the relay device 110 may transmit a transmission command to the host device 105 over the communications link 120. The host device 105 may start or resume transmissions (e.g., of data packets) via the transmit pipe 140 based on the transmission command.

Examples of aspects described herein may differ from some data packet network implementations in which a host device (e.g., host device 105) may receive and respond to pause frames and/or transmission commands received directly from a peer device (e.g., peer device 115). For example, in some other implementations (e.g., without a relay device 110), a host device (e.g., host device 105) may receive a pause frame or a transmission command directly from a peer device (e.g., peer device 115) over the communications link 116.

The peer device 115 may include a pause FSM 165 (also referred to herein as a finite-state automaton, a finite automaton, or a state machine), a receive buffer 170 (also referred to herein as a data buffer), and a transmit pipe 175 (also referred to herein as a transmission pipeline). The pause FSM 165, receive buffer 170, and transmit pipe 140 may include examples of aspects of the pause FSM 130, receive buffer 135, and transmit pipe 140, respectively.

The receive buffer 170 may be, for example, a FIFO data buffer. The peer device 115 may store data packets received from the host device 105 (e.g., received via the relay device 110). The transmit pipe 175 may be, for example, a data path including a set of logical connections, and the transmit pipe 175 may be compatible with PIPE specifications. The peer device 115 may transmit data packets over the communications link 125, for example, via the transmit pipe 175.

The pause FSM 165 may support flow control between the peer device 115, the relay device 110, and the peer device 115. In some aspects, the pause FSM 165 may support flow control in both directions (e.g., between the peer device 115 and the relay device 110, between the host device 105 and the peer device 115 (via the relay device 110), etc.) over the communications link 125.

For example, based on a state of the pause FSM 165, the peer device 115 (the pause FSM 165) may output a pause frame for pausing transmissions (e.g., of data packets) by the host device 105. Alternatively, or additionally, the peer device 115 may respond to pause frames received from other devices (e.g., the host device 105). In some cases, based on the state of the pause FSM 165, the peer device 115 may transmit a transmission command (also referred to herein as a start transmission command) to the host device 105 for enabling or unpausing data packet transmissions by the host device 105. In some aspects, the peer device 115 may transmit pause frames and/or transmission commands to the host device 105 directly or indirectly (e.g., via the relay device 110).

In an example, based on an amount of data stored in the receive buffer 170 exceeding a threshold, the pause FSM 165 may enter a first state (e.g., a pause state), and the peer device 115 (the pause FSM 165) may output the pause frame. In another example, based on an amount of data stored in the receive buffer 170 being less than a threshold, the pause FSM 165 may enter a second state (e.g., an unpause state), and the peer device 115 (the pause FSM 165) may output a transmission command for starting or resuming data packet transmissions by the host device 105. The peer device 115 may process (e.g., using a processor included in the peer device 115) data packets stored in the receive buffer 170, and the pause FSM 165 may enter the unpause state based on detecting the amount of data stored in the receive buffer 170 is less than the threshold.

In another example, the peer device 115 may respond to pause frames received by the host device 105. For example, the peer device 115 may receive a pause frame from the host device 105 for pausing transmissions (e.g., of data packets) by the peer device 115. In an example, the peer device 115 may receive the pause frame indirectly from the host device 105 (e.g., via the relay device 110), over communications link 125. The peer device 115 may pause transmissions (e.g., of data packets) via the transmit pipe 175 based on the pause frame.

In another example, the peer device 115 may respond to pause frames received by the relay device 110. For example, the host device 105 may transmit the pause frame to the relay device 110 over the communications link 120, and the relay device 110 may transmit a corresponding pause frame (or the same pause frame) to the peer device 115 over the communications link 125. The peer device 115 may pause transmissions (e.g., of data packets) via the transmit pipe 175 based on the pause frame.

Alternatively, or additionally, the peer device 115 may respond to transmission commands received from the host device 105. For example, the peer device 115 may receive a transmission command (also referred to herein as a start transmission command) from the host device 105 for starting or resuming data packet transmissions by the peer device 115. In an example, the peer device 115 may receive the transmission command from the host device 105 over the communications link 125).

In another example, the peer device 115 may respond to transmission commands received from the relay device 110. For example, the host device 105 may transmit a transmission command to the relay device 110 over the communications link 120, and the relay device 110 may transmit a corresponding transmission command (or relay the same transmission command) to the peer device 115 over the communications link 125. The peer device 115 may start or resume transmissions (e.g., of data packets) via the transmit pipe 175 based on the transmission command.

The relay device 110 may include, for example, a MACsec engine configured to relay data packets between the host device 105 and the peer device 115. In some aspects, the relay device 110 may support performing one or more encryption processes or conversion processes on data packets or signaling received from the host device 105 and/or the peer device 115. For example, for signaling received from the host device 105 or the peer device 115, the relay device 110 may perform signal processing operations such as signal amplification, signal conversion (e.g., from electrical signaling to optical signaling, from a set of specifications to another set of specifications), and/or protocol conversion (e.g., the relay device 110 may function as a repeater). Accordingly, in some examples, input bandwidth at the relay device 110 may be different from output bandwidth. The relay device 110 may include a transmit pipe 145, a receive buffer 150, a pause aggregation engine 155, a pause FSM 160, and a pause FSM 161.

The transmit pipe 145 may be, for example, a data path including a set of logical connections, and the transmit pipe 140 may be compatible with PIPE specifications. The relay device 110 may transmit data packets over the communications link 120 and/or the communications link 125, for example, via the transmit pipe 145.

The receive buffer 150 may be, for example, a FIFO data buffer. The relay device 110 may store, in the receive buffer 150, data packets received from the host device 105. In an example, the relay device 110 may store, in the receive buffer 150, incoming data packets received from the host device 105 (e.g., via a host side of the relay device 110). In some examples, the relay device 110 may remove from the receive buffer 150, data packets which have been successfully encrypted and relayed to the peer device 115. In an example, the relay device 110 may relay the data packets via the line side of the relay device 110.

The pause aggregation engine 155 may monitor a buffer status (e.g., a buffer utilization) of the receive buffer 150 and a status (e.g., state) of the pause FSM 160. The buffer status may indicate, for example, whether the buffer utilization exceeds a data storage capacity of the receive buffer 150. In some aspects, the buffer status may indicate whether the buffer utilization exceeds a data storage threshold. The data storage threshold may be different from (e.g., less than) the data storage capacity.

Alternatively, or additionally, the buffer status may be based on a quantity of empty data byte locations in the receive buffer 150. For example, the buffer status may indicate whether the quantity of empty data byte locations is above a threshold. Based on the buffer status of the receive buffer 150 and/or the status of the pause FSM 160, for example, the relay device 110 (e.g., pause aggregation engine 155) may transmit a pause frame or a transmission command to the host device 105.

The pause FSM 160 may support flow control between the host device 105, the relay device 110, and the peer device 115. In some aspects, the pause FSM 160 may support flow control from host device 105 to peer device 115. The pause FSM 160 may be referred to herein as a 'modified pause FSM', a 'peer pause FSM shadow,' or a 'peer pause FSM reflection.' For example, the pause FSM 160 may be a shadow FSM capable of mirroring the state of the pause FSM 165. In some aspects, the pause FSM 160 may be a shadow FSM capable of predicting an FSM state of the pause FSM 165 of the peer device 115. In some aspects, the pause FSM 160 may include a machine learning network (e.g., implemented by one or more processors of the relay device 110 and/or program instructions stored in a memory of the relay device 110) which may be trained during run-time of the relay device 110.

In an example, the receive buffer 150 may be empty or near empty (e.g., buffer utilization is below a threshold, the amount of data packets stored in the receive buffer 150 is below a threshold), and a receive state of the peer device 115 may allow sending packets to the peer device 115 (e.g., as indicated by the pause FSM 160 ('peer pause FSM reflection')). Based on the buffer utilization at the relay device 110 and the receive state of the peer device 115, the relay device 110 may transmit a transmission command (also referred to herein as a 'continuation request') to the host device 105 for sending data packets to the peer device 115. Alternatively, or additionally, as described herein, if the receive buffer 150 is full with data packets from the host device 105 (e.g., buffer utilization is above a threshold), the relay device 110 may generate and output a pause frame (also referred to herein as a 'pause command,' a 'stop indication,' or a 'pause packet') to the host device 105.

In another aspect, the host device 105 may transmit a request (e.g., a pause frame) to the peer device 115, via the relay device 110, to stop sending data traffic. The relay device 110 may forward the request to the peer device 115 and, for example, refrain from absorbing data packets received from the peer device 115. For example, rather than storing data packets from the peer device 115 in a data buffer (e.g., a line-side data buffer,' a 'peer-side data buffer'), the relay device 110 may continue forwarding data packets to the host device 105 until the stream of data packets ends.

The pause FSM 161 may include example aspects of the pause FSM 160. For example, the pause FSM 161 may support flow control between the peer device 115, the relay device 110, and the host device 105. In some aspects, the pause FSM 161 may support flow control from peer device 115 to host device 105. The pause FSM 161 may be referred to herein as a 'modified pause FSM', a 'host pause FSM shadow,' or a 'host pause FSM reflection.' For example, the pause FSM 161 may be a shadow FSM capable of mirroring the state of the pause FSM 130. In some aspects, the pause FSM 161 may be a shadow FSM capable of predicting an FSM state of the pause FSM 130 of the host device 105. In some aspects, the pause FSM 161 may include a machine learning network (e.g., implemented by one or more processors of the relay device 110 and/or program instructions stored in a memory of the relay device 110) which may be trained during run-time of the relay device 110.

The pause aggregation engine 155 and/or the pause FSM 160 may be implemented by program instructions (instruction sets) stored in a memory of the relay device 110. For example, the memory may be configured to store instruction sets and other data structures, in addition to temporarily storing data for a processor of the relay device 110 to execute various types of routines or functions. In an example, the program instructions (instruction sets) may be executable by the processor to provide functionality of the pause aggregation engine 155 and/or the pause FSM 160 described herein. The pause aggregation engine 155 may include a single or multiple engines.

According to example aspects of the present disclosure, the relay device 110 may support (e.g., using the pause aggregation engine 155 and/or the pause FSM 160) a lossless transmission of data packets between the host device 105 and the peer device 115. For example, the relay device 110 may transmit a pause frame (also referred to herein as a pause message, a pause command, etc.) to the host device 105 for pausing data packet transmissions by the host device 105. The pause frame, for example, may indicate a specified period of time for pausing data packet transmissions. In some other examples, the relay device 110 may transmit a transmission command (also referred to herein as a start transmission command) to the host device 105 for enabling or unpausing data packet transmissions by the host device 105. The relay device 110, in some examples, may transmit pause frames and/or transmission commands periodically (based on an interval). In an example, the relay device 110 may transmit pause frames and/or transmission commands to the host device 105 over the communications link 120.

The relay device 110 (e.g., pause aggregation engine 155) may transmit a pause frame or a transmission command to the host device 105 based on a state of the pause FSM 160. In an example, the pause FSM 160 may transition to a first state (e.g., a pause state) or a second state (e.g., an unpause state) based on a utilization of the receive buffer 150 (e.g., amount of stored data) with respect to a data storage capacity. In some examples, the pause FSM 160 may transition to a pause state or an unpause state based on a utilization of the receive buffer 150 with respect to a data storage threshold. The data storage threshold may be different from (e.g., less than) the data storage capacity. The data storage threshold may be referred to as a buffer threshold.

In another example, the pause FSM 160 may transition to the pause state or unpause state based on a pause frame or a transmission command received by the relay device 110 from the peer device 115. In some other examples, the pause FSM 160 may transition to a pause state or an unpause state based on the utilization of the receive buffer 150 with respect to the data storage capacity (or data storage threshold). In some cases, the pause FSM 160 may transition to a pause state or an unpause state based on the utilization of the receive buffer as described herein, in combination with receiving a pause frame or a transmission command.

In some aspects, the relay device 110 (based on design parameters) may set the data storage threshold so as not to exceed the data storage capacity of the receive buffer 150. For example, the relay device 110 may set the data storage threshold such that, if the data storage threshold at the receive buffer 150 is exceeded and the relay device 110 transmits a pause frame to the host device 105, the relay device 110 can accept and process the data packets (or frames) already transmitted over the communications link 120 by the host device 105, without exceeding the data storage capacity of the receive buffer 150. That is, for example, the host device 105 will have enough time to stop transmitting data packets (or frames) and the relay device 110 can accept and process the data packets (or frames) already on the communications link 120, without exceeding the data storage capacity of the receive buffer 150. In some aspects, the relay device 110 may set the data storage threshold of the receive buffer 150 to prevent packet loss (e.g., prevent discarding received data packets).

In an example case, the relay device 110 (e.g., pause aggregation engine 155) may transmit a pause frame to the host device 105 based on a utilization of the receive buffer 150 being equal to (e.g., reaching) a data storage capacity of the receive buffer 150. In some aspects, the relay device 110 may transmit a pause frame based on a utilization of the receive buffer 150 being greater than or equal to a data storage threshold (e.g., a threshold different from, for example, less than the data storage capacity). For example, based on an amount of data stored in the receive buffer 150 being equal to the data storage capacity (or the data storage threshold), the relay device 110 (e.g., the pause aggregation engine 155) may transmit a pause frame to the host device 105 over the communications link 120 (communications link 111).

In another example case, the relay device 110 (e.g., at the pause FSM 160) may receive a pause frame from the peer device 115 over the communications link 125. Based on the pause frame, for example, the relay device 110 (e.g., pause aggregation engine 155) may transmit a pause frame to the host device 105 over the communications link 120. In some other examples, the relay device 110 may transmit a pause frame to the host device 105 based on both the utilization of the receive buffer 150 being equal to the data storage capacity (or the data storage threshold) and the pause frame received from the peer device 115.

Alternatively, or additionally, the relay device 110 (e.g., pause aggregation engine 155) may transmit a transmission command to the host device 105 based on a utilization of the receive buffer 150 falling below the data storage capacity (or the data storage threshold). For example, based on an amount of data stored in the receive buffer 150 falling below the data storage capacity (or the data storage threshold), the pause FSM 160 may exit the pause state (e.g., enter an unpause state), and the relay device 110 may transmit the transmission command to the host device 105 over the communications link 120.

In another example case, the relay device 110 (e.g., at the pause FSM 160) may receive a transmission command (also referred to herein as a start transmission command) from the peer device 115 over the communications link 125. Based on the transmission command from the peer device 115, for example, the relay device 110 (e.g., pause aggregation engine 155) may transmit a transmission command to the host device 105 over the communications link 120. In some other examples, the relay device 110 may transmit a transmission command to the host device 105 based on both the utilization of the receive buffer 150 falling below the data storage capacity (or the data storage threshold) and the transmission command received from the peer device 115.

The pause frames described herein (e.g., pause frames communicated by the host device 105, the relay device 110, and/or the peer device 115) may be, for example, priority-based flow control (PFC) pause frames supportive of symmetric pause. For example, the pause frames described herein may include PFC pause frames supportive of pausing incoming data traffic to a device (e.g., host device 105, relay device 110, peer device 115, etc.). In an example, pause frames transmitted from the relay device 110 to the host device 105 may include PFC pause frames indicating a request to for the host device 105 to pause (e.g., refrain from) transmitting data packets. In some aspects, based on a PFC pause frame, the host device 105 may refrain from transmitting data packets (or frames) associated with a priority level corresponding to the PFC pause frame, while continuing to transmit data packets (or frames) associated with different priority levels.

In some aspects, the pause frames described herein (e.g., communicated by the host device 105, the relay device 110, and/or the peer device 115) may be referred to as XOFF (e.g., "transmit off") commands or XOFF codes. The transmission commands described herein (e.g., communicated by the host device 105, the relay device 110, and/or the peer device 115) may be referred to as XON (e.g., "transmit on") commands or XON codes. Aspects of the flow control described herein with reference to the system 100 may be referred to as software flow control or XON/XOFF flow control.

In some aspects, the pause frames described herein may be, for example, Ethernet pause frames supportive of symmetric and asymmetric pause. For example, the pause frames described herein may Ethernet pause frames supportive of pausing the transmission of any or all traffic (e.g., data traffic from the relay device 110 to the peer device 115, data traffic from the peer device 115 to the relay device 110, or both) on the communications link 125.

According to example aspects of the present disclosure, if the host device 105 is enabled (e.g., by shadow logic) and the receive buffer 150 is full, the relay device 110 (e.g., pause aggregation engine 155) may transmit a pause frame to the host device 105. In some aspects, sending the pause frame may protect the receive buffer 150 (e.g., prevent buffer overflow, prevent packet loss). Additional example aspects of the relay device 110 are further described with reference to FIG. 2.

Figure 2:
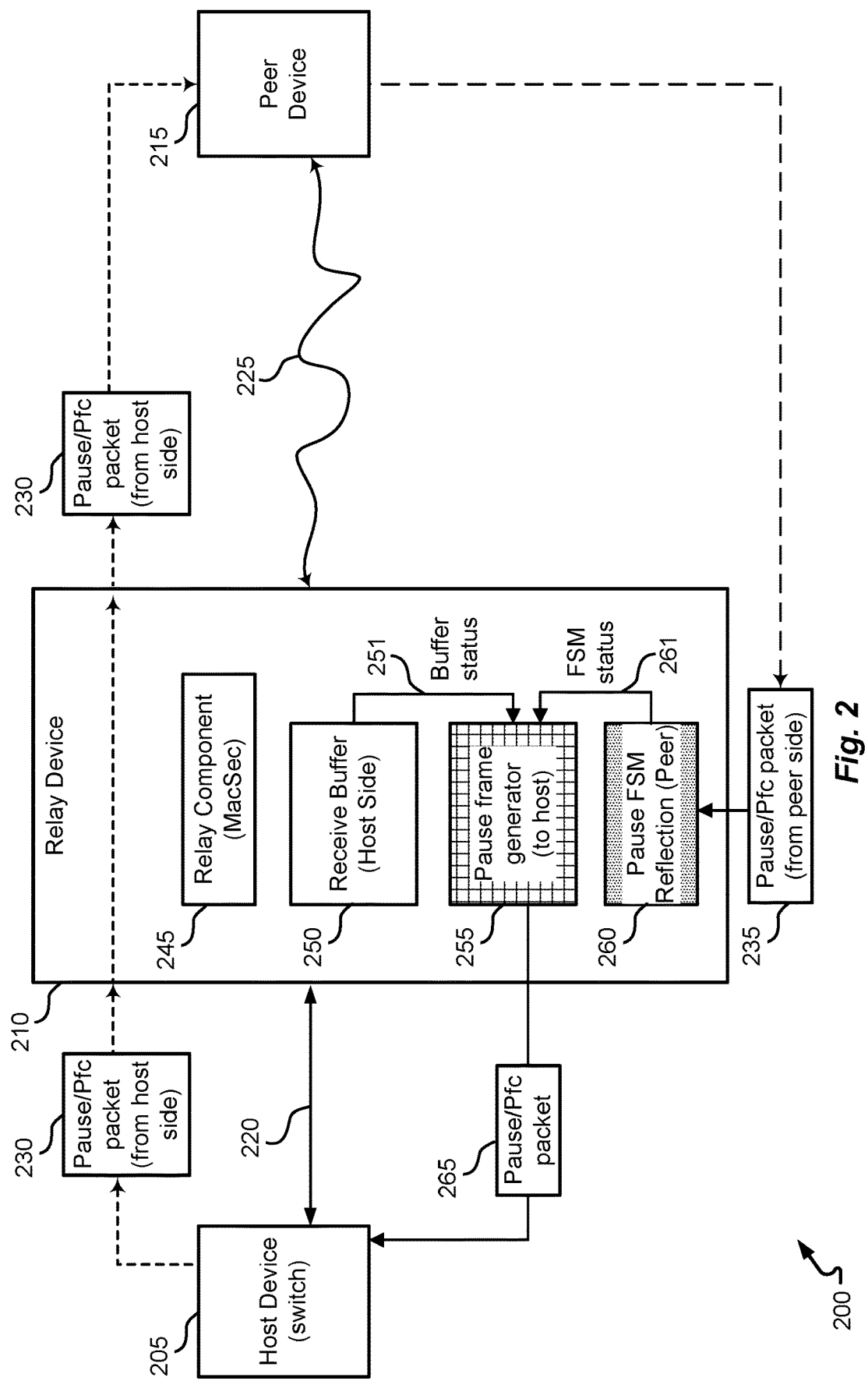
FIG. 2 illustrates an example of a system that supports Ethernet pause aggregation for a relay device in accordance with aspects of the present disclosure.

FIG. 2 illustrates an example of a system 200 that supports Ethernet pause aggregation for a relay device in accordance with aspects of the present disclosure. In some examples, the system 200 may implement aspects of the system 100 described with reference to FIG. 1. For example, the system 100 may include a host device 205, a relay device 210, and a peer device 215. The host device 205 and the relay device 210 may communicate via a communications link 220. The relay device 210 and the peer device 215 may communicate via a communications link 225. The host device 205, relay device 210, peer device 215, communications link 220, and communications link 225 may be examples of a host device 105, a relay device 110, a peer device 115, a communications link 120, and a communications link 125 respectively described with reference to FIG. 1.

The relay device 210 may include a relay component 245, a receive buffer 250 (also referred to herein as a data buffer), a pause frame generator 255 (also referred to herein as a pause packet generator), and a pause FSM 260 (also referred to herein as referred to herein as a 'modified pause FSM', a "peer pause FSM shadow," a 'pause FSM reflection,' or a 'peer pause FSM reflection'). The relay component 245 may be, for example, a MACsec engine configured to perform one or more encryption processes or conversion processes on data packets or signaling received from the host device 205 and/or the peer device 215. For example, for signaling received from the host device 205 or the peer device 215, the relay component 245 may perform signal processing operations such as signal amplification, signal conversion (e.g., from electrical signaling to optical signaling, from a set of specifications to another set of specifications), and/or protocol conversion (e.g., the relay device 210 may function as a repeater). The receive buffer 250 (also referred to herein as a 'host-side buffer,' a 'host-side data buffer,' or a 'relay unit packet buffer'), pause frame generator 255, and pause FSM 260 may be examples of the receive buffer 150, the pause aggregation engine 155, and the pause FSM 160 described with reference to FIG. 1.

The system 200 may support the communication of data packets between the host device 205 and the peer device 215, for example, via the relay device 210. In some aspects, the system 200 may implement aspects of flow control supportive of lossless transmission (e.g., avoiding dropped frames or data packets) between the host device 205, the relay device 210, and the peer device 215. For example, the system 200 may support stopping the flow of data packets at both the host side (e.g., a relatively short communications link) and the line side (e.g., a relatively long communications link) of the relay device 210. In an example, the system 200 may support a lossless mode of operation from the host device 205 to the relay device 210 and a lossless mode of operation from the relay device 210 to the peer device 215. In another example, the system 200 may support a lossless mode of operation from the peer device 215 (via the relay device 210) to the host device 205.

With reference to FIG. 2, based on a state of a pause FSM of the host device 205 (e.g., a pause FSM 130 described with reference to FIG. 1), the host device 205 may output a pause frame 230 for pausing transmissions (e.g., of data packets) by the peer device 215 for a specified period of time. Alternatively, or additionally, based on the state of the pause FSM of the host device 205, the host device 205 may output a transmission command (e.g., instead of the pause frame 230) for starting or resuming transmissions of data packets by the peer device 215. In some aspects, the host device 205 may transmit pause frames 230 and/or transmission commands indirectly to the peer device 215, via the relay device 210 (e.g., via the communications link 220 and the communications link 225). For example, in some systems (e.g., an Ethernet network), once a relay device 210 is added between nodes of the Ethernet network (e.g., a host device 205 and a peer device 215, or between any other Ethernet nodes), there is no direct connectivity between the nodes, and any communication between nodes is forwarded through the relay device 210.

In some aspects, any information (e.g., data packets) communicated between the host device 205 and the relay device 210 is over communications link 220. For example, services associated with communicating information (e.g., data packets) between the host device 205 and the relay device 210 may be implemented over communications link 220. In some aspects, any information (e.g., data packets)

communicated between the relay device 210 and the peer device 215 is over communications link 225. For example, services associated with communicating information (e.g., data packets) between the relay device 210 and the peer device 215 may be implemented over communications link 225.

In an example, although illustrated as different arrows in FIG. 2, the relay device 210 may receive pause frames 230 from the host device 205, over the communications link 220. Further, although illustrated as different arrows in FIG. 2, the relay device 210 may forward the pause frames 230 to the peer device 215, over the communications link 225.

In another example, although illustrated as different arrows in FIG. 2, the relay device 210 may receive pause frames 235 from the peer device 215, over the communications link 225. The pause frames 235 may be fed to the pause FSM 260. Further, although illustrated as different arrows in FIG. 2, the relay device 210 may forward the pause frames 235 to the host device 205 (e.g., see pause frames 265), over the communications link 220. For example, the relay device 210 may forward (e.g., transmit) the pause frames 235 to the host device 205 based on the status of the receive buffer 250 (e.g., host-side buffer) and/or an indication (e.g., a pause command, a transmission command) in the pause frame 235, aspects of which are described herein.

In some examples, based on a state of a pause FSM of the peer device 215 (e.g., pause FSM 165 described with reference to FIG. 1), the peer device 215 may output a pause frame 235 for pausing transmissions of data packets by the host device 205 for a specified period of time. Alternatively, or additionally, based on the state of the pause FSM of the peer device 215, the peer device 215 may output a transmission command (e.g., instead of the pause frame 235) for starting or resuming transmissions of data packets by the host device 205.

Example aspects of the present disclosure may support indirect transmission of pause frames 235 and/or transmission commands from the peer device 215 to the host device 205. For example, the peer device 215 may transmit pause frames 235 and/or transmission commands indirectly to the host device 205, via the relay device 210 (e.g., over the communications link 225 and the communications link 220).

For example, the peer device 215 may transmit a pause frame 235 to the relay device 210, based on which the relay device 210 may transmit a corresponding pause frame (e.g., a pause frame 265) to the host device 205. In another example, the peer device 215 may transmit a transmission command to the relay device 210, based on which the relay device 210 may transmit a corresponding transmission command to the host device 205. In some aspects, the indirect transmission of pause frames 235 and/or transmission commands between the peer device 215 and the host device 205 (e.g., via the relay device 210) may be different from implementations in some other data packet networks in which a peer device transmits pause frames and/or transmission commands directly to a host device. For example, aspects of indirect transmission of pause frames 235 and/or transmission commands may differ from other implementations in which the peer device 215 may transmit pause frames 235 and/or transmission commands directly to the host device 205, via a communications channel different from the communications link 220 and communications link 225 (e.g., without the relay device 210, bypassing the relay device 210).

According to example aspects of the present disclosure, the relay device 210 (e.g., pause frame generator 255) may transmit a pause frame 265 to the host device 205 based on a utilization of the receive buffer 250 being equal to (e.g., reaching) a data storage capacity of the receive buffer 250. In some aspects, the relay device 210 may transmit a pause frame 265 based on a utilization of the receive buffer 250 being greater than or equal to a data storage threshold different from (e.g., less than) the data storage capacity. In some other aspects, the relay device 210 (e.g., pause frame generator 255) may transmit a pause frame 265 based on the relay device 210 receiving (e.g., at the pause FSM 260) a pause frame 235 from the peer device 215 over the communications link 225. In some aspects, although illustrated as different arrows in FIG. 2, the relay device 210 may transmit the pause frame 265 to the host device 205 over the communications link 220.

Alternatively, or additionally, the relay device 210 (e.g., pause frame generator 255) may transmit a transmission command (e.g., instead of the pause frame 265) to the host device 205 based on a utilization of the receive buffer 250 being less than the data storage capacity of the receive buffer 250. In some aspects, the relay device 210 may transmit a transmission command based on a utilization of the receive buffer 250 being less than the data storage threshold of the receive buffer 250. In some other aspects, the relay device 210 (e.g., pause frame generator 255) may transmit a transmission command based on the relay device 210 receiving a transmission command (e.g., instead of the pause frame 235) from the peer device 215 over the communications link 225. In some aspects, the relay device 210 may transmit the transmission command to the host device 205 over the communications link 220.

For example, the relay device 210 (e.g., at the pause frame generator 255) may output a pause frame 265 or a transmission command based on a buffer status 251 of the receive buffer 250. In another example, the relay device 210 (e.g., at the pause frame generator 255) may output a pause frame 265 or a transmission command based on an FSM status of the pause FSM 260. In some other examples, the relay device 210 (e.g., at the pause frame generator 255) may output a pause frame 265 or a transmission command based on a combination of the buffer status 251 and the FSM status 261.

In some aspects, the relay device 210 (e.g., at the receive buffer 250) may output the buffer status 251 based on a comparison of an amount of data stored in the receive buffer 250 to the data storage capacity (or the data storage threshold) of the receive buffer 250. In an example, based on the comparison, the buffer status 251 may indicate that the receive buffer 250 is "full" if the amount of data stored in the receive buffer 250 is equal to (e.g., reaches) a data storage capacity of the receive buffer 250. In another example, based on the comparison, the buffer status 251 may indicate whether the amount of data stored in the receive buffer 250 is greater than or equal to the data storage threshold of the receive buffer 250. In some examples, based on the comparison, the buffer status 251 may indicate whether the amount of data stored in the receive buffer 250 is less than the data storage threshold.

The FSM status 261 may indicate a state (e.g., a pause state, an unpause state) of the pause FSM 260. For example, the pause FSM 260 may transition to the pause state from the unpause state based on the relay device 210 (e.g., at the pause FSM 260) receiving a pause frame 235 from the peer device 215. In an example, the pause FSM 260 may set the FSM status 261 to indicate the pause state. Alternatively, or additionally, the pause FSM 260 may transition to the unpause state from the pause state based on the relay device 210 (e.g., at the pause FSM 260) receiving a transmission command (e.g., instead of the pause frame 235) from the peer device 215. In an example, the pause FSM 260 may set the FSM status 261 to indicate the unpause state. In some aspects, the pause state and the unpause state may respectively correspond to different modes of the pause FSM 260.

In an example case, the relay device 210 (e.g., pause frame generator 255) may transmit a pause frame 265 to the host device 105 based on an indication in the buffer status 251 that the utilization of the receive buffer 250 is equal to the data storage capacity of the receive buffer 250. In another example case, the relay device 210 may transmit the pause frame 265 to the host device 205 based on an indication in the buffer status 251 that the utilization of the receive buffer 250 is greater than or equal to the data storage threshold of the receive buffer 250. In some aspects, the relay device 210 may transmit the pause frame 265 without receiving a pause frame 235 from the peer device 215.

In other example cases, the relay device 210 (e.g., at the pause FSM 260) may receive a pause frame 235 from the peer device 215 over the communications link 225. Based on the pause frame 235, the pause FSM 260 may enter a pause state. The relay device 210 (e.g., at the pause frame generator 255) may determine, from the FSM status 261 (e.g., the indication of the pause state), that the pause FSM 260 is in the pause state. The relay device 210 (e.g., pause frame generator 255) may transmit a pause frame 265 to the host device 105 based on the FSM status 261.

In another example case, the relay device 210 (e.g., at the pause FSM 260) may receive a transmission command (also referred to herein as a start transmission command) from the peer device 215 over the communications link 225. Based on the transmission command, the pause FSM 260 may enter an unpause state. The relay device 210 (e.g., at the pause frame generator 255) may determine, from the FSM status 261 (e.g., the indication of the unpause state), that the pause FSM 260 is in the unpause state. The relay device 210 (e.g., pause frame generator 255) may transmit a transmission command to the host device 105 based on the FSM status 261.

In another example case, the relay device 210 may transmit a transmission command to the host device 105 based on the FSM status 261 (e.g., an indication of the unpause state) in combination with the buffer status 251 indicating that the utilization of the receive buffer 250 is less than the data storage threshold of the receive buffer 250. In some examples, the relay device 210 may transmit a transmission command to the host device 105 based on the FSM status 261 (e.g., an indication of the unpause state) in combination with the buffer status 251 indicating that the utilization of the receive buffer 250 is less than the data storage capacity the receive buffer 250.

In some aspects, the relay device 210 may store the pause frame 235, an indication associated with the pause frame 235, or both in a memory of the relay device 210. In some aspects, the relay device 210 may store a received transmission command, an indication associated with the transmission command, or both in a memory of the relay device 210. In some cases, the FSM status 261 (e.g., pause state, unpause state) described herein may indicate characteristics associated with a pause frame 235 (e.g., 'do not send' data packets) or a transmission command (e.g., 'send' data packets).

In an example case, the relay device 210 may support a reduced buffer size compared to some other relay devices. For example, the receive buffer 250 may have a reduced buffer size compared to receive buffers of some other relay devices. In an example, the relay device 210 may refrain from transmitting a transmission command to the host device 205, even if the buffer status 251 indicates that the utilization of the receive buffer 250 is less than the data storage threshold (or the data storage capacity) of the receive buffer 250. For example, the relay device 210 may wait to receive a transmission command from the peer device 215 before transmitting a transmission command to the host device 205. Accordingly, for example, the relay device 210 may refrain from accumulating an amount of data in the receive buffer 250 that exceeds the data storage threshold (or the data storage capacity) of the receive buffer 250.

According to example aspects of the present disclosure, the size of the receive buffer 250 may be determined based on an interface bandwidth associated with the communications link 225, a distance between the relay device 210 and the peer device 215, and/or a transmission speed associated with the communications link 225. For example, the relay device 210 may support various lengths and/or transmission speeds of the communications link 225. In an example, the size of the receive buffer 250 may be determined or set to support a lossless flow of data from the host device 205 to the peer device 215 (e.g., via the relay device 210). The relay device 210 may store, in the receive buffer 250, data packets received from the host device 205, while refraining from discarding any of the received data packets.

In an example, the communications link 225 may have a length of at least 5 meters (e.g., such that a round trip distance between the relay device 210 and the peer device 215 is equal to at least 10 meters), and the communications link 225 may support a data transmission speed of at least 400 Gigabits/second. Based on the example, the relay device 210 may support a receive buffer size (e.g., a 'host-side data buffer' for storing data packets received from a host device 205 and for forwarding the data packets to the peer device 215) that is smaller compared to receive buffers (e.g., 'host-side data buffers') in some relay devices. For example, the data storage capacity of the receive buffer 250 may be less than or equal to 50 kb. In another example, the data storage capacity of the receive buffer 250 may be less than or equal to 25 kb. In some aspects, the relay device 210 may support a shared buffer for storing packets both from the peer device 215 (e.g., peer-side buffer) and from the host device 205 (e.g., host-side buffer).

The pause frames described herein (e.g., pause frame 230, pause frame 235, pause frame 265) may include aspects of the pause frames described with reference to FIG. 1. For example, the pause frames may be, for example, PFC pause frames supportive of symmetric pause. In some aspects, the pause frames may be Ethernet pause frames supportive of symmetric and asymmetric pause.

Figure 3:
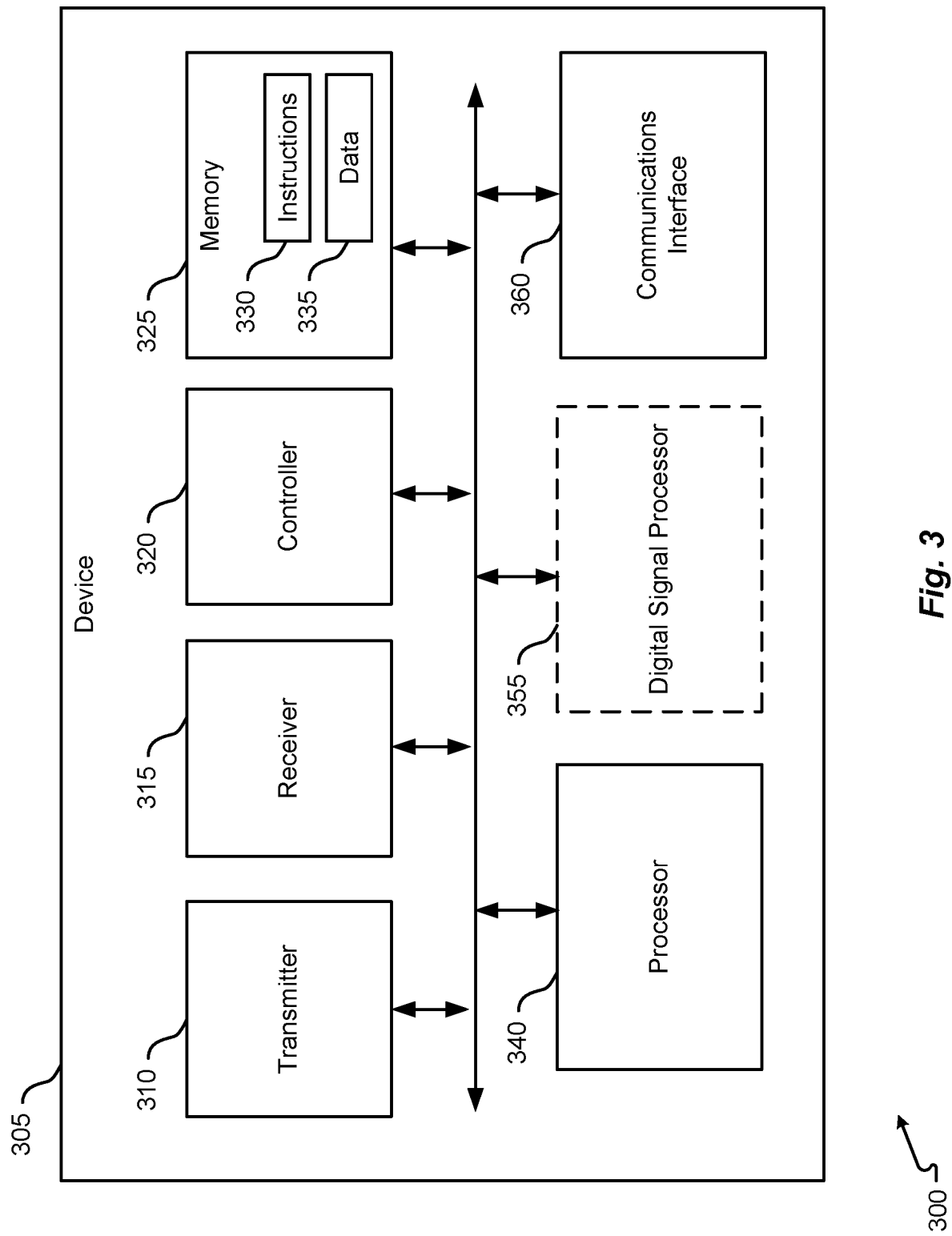
FIG. 3 illustrates an example of a relay device that supports Ethernet pause aggregation for a relay device in accordance with aspects of the present disclosure.

FIG. 3 illustrates an example of a system 300 that supports Ethernet pause aggregation for a relay device in accordance with aspects of the present disclosure. The system 300 may include a relay device 305. The relay device 305 may include aspects of a relay device 110 or a relay device 210 described with reference to FIGS. 1 and 2. The relay device 305 may perform any or all of the operations described in the present disclosure.

The relay device 305 may include a transmitter 310, a receiver 315, a communications interface 320, a controller 320, a memory 325, a processor 340, and a communications interface 360. In some examples, components of the relay device 305 (e.g., transmitter 310, receiver 315, controller 320, memory 325, processor 340, communications interface 360, etc.) may communicate over a system bus (e.g., control busses, address busses, data busses, etc.) included in the relay device 305.

The transmitter 310 and the receiver 315 may support the transmission and reception of signals to and from the relay device 305. In some aspects, the transmitter 310 and the receiver 315 may support the transmission and reception of signals within the relay device 305. The transmitter 310 and receiver 315 may be collectively referred to as a transceiver. An antenna may be electrically coupled to the transceiver. The relay device 305 may also include (not shown) multiple transmitters 310, multiple receivers 315, multiple transceivers and/or multiple antennas.

The controller 320 may be located on a same chip (e.g., ASIC chip) as the transmitter 310 and/or the receiver 315. In some cases, the controller 320 may be located on a different chip as the transmitter 310 and/or the receiver 315. In some examples, the controller 320 may be located on the same chip (or a different chip) as the relay device 305. The controller 320 may instruct components in the relay device 305 (e.g., processor 340, digital signal processor (DSP) 355) to perform one or more encryption processes and/or signal processing operations (e.g., signal amplification, signal conversion, and/or protocol conversion) on data packets or signaling received from a host device (e.g., host device 105, host device 205) and/or a peer device (e.g., peer device 115, peer device 215). In some examples, the controller 320 may be a programmed microprocessor or microcontroller. In some aspects, the controller 320 may include one or more CPUs, memory, and programmable I/O peripherals.

The memory 325 may be any electronic component capable of storing electronic information. The memory 325 may be, for example, random access memory (RAM), read-only memory (ROM), magnetic disk storage media, optical storage media, flash memory devices in RAM, on-board memory included with the processor, EPROM memory, EEPROM memory, registers, and so forth, including combinations thereof.

The memory 325 may include instructions 330 (computer readable code) and data 335 stored thereon. The instructions 330 may be executable by the processor 340 to implement the methods disclosed herein. In some aspects, execution of the instructions 330 may involve one or more portions of the data 335. In some examples, when the processor 340 executes the instructions 330, various portions of the instructions 330 and/or the data 335 may be loaded onto the processor 340.

The processor 340 may correspond to one or multiple computer processing devices. For example, the processor 340 may include a silicon chip, such as a Field Programmable Gate Array (FPGA), an ASIC, any other type of Integrated Circuit (IC) chip, a collection of IC chips, or the like. In some aspects, the processors may include a microprocessor, a Central Processing Unit (CPU), a Graphics Processing Unit (GPU), or plurality of microprocessors configured to execute instructions sets stored in a corresponding memory (e.g., memory 325 of the relay device 305). For example, upon executing the instruction sets stored in memory 325, the processor 340 may enable or perform one or more functions of the relay device 305. In some examples, a combination of processors 340 (e.g., an advanced reduced instruction set computer (RISC) machine (ARM) and the DSP 355) may be implemented in the relay device 305.

The communications interface 360 may support interactions (e.g., via a physical or virtual interface) between a user and the relay device 305.

Figure 4:
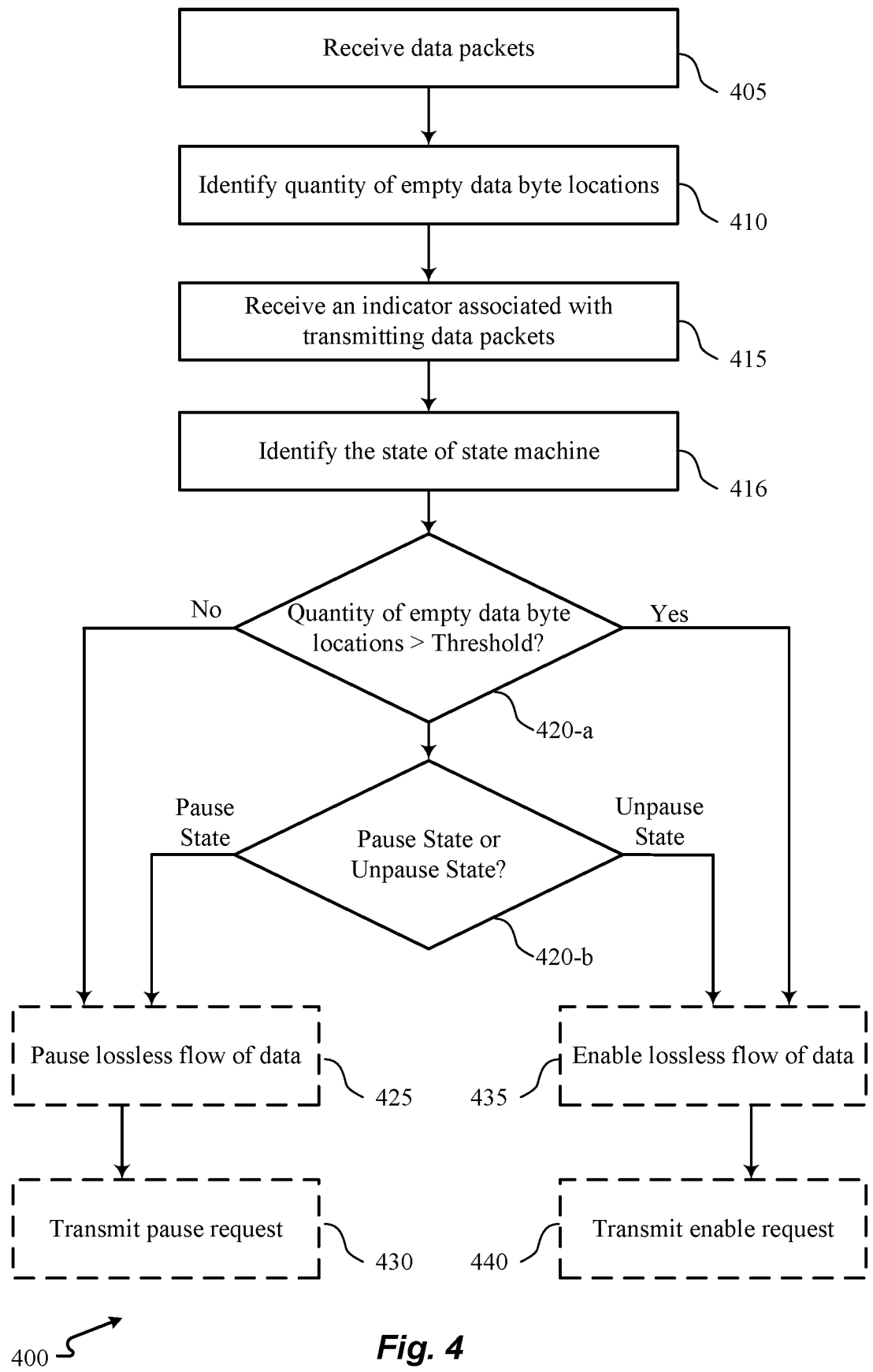
FIG. 4 illustrates an example of a process flow that supports Ethernet pause aggregation for a relay device in accordance with aspects of the present disclosure.

FIG. 4 illustrates an example of a process flow 400 that supports Ethernet pause aggregation for a relay device in accordance with aspects of the present disclosure. In some examples, process flow 400 may implement aspects of systems 100, system 200, or system 300. Further, process flow 400 may be implemented by a relay device 110, relay device 210, or relay device 305 described with reference to FIGS. 1 through 3. In an example, the process flow 400 may support flow control in a network described herein (e.g., a LAN).

In the following description of the process flow 400, the operations may be performed in a different order than the order shown, or the operations may be performed in different orders or at different times. Certain operations may also be left out of the process flow 400, or other operations may be added to the process flow 400. It is to be understood that while a relay device 110 is described as performing a number of the operations of process flow 400, any device (e.g., any relay device 110 in communication with a host device and a peer device) may perform the operations shown.

At 405, the relay device 110 may receive a set of data packets. In an example, the relay device 110 may store the set of data packets to a data buffer of the relay device 110. In some examples, receiving the set of data packets, storing the set of data packets, or both may include refraining from discarding one or more data packets of the set of data packets.

At 410, the relay device 110 may identify a quantity of empty data byte locations in a data buffer of the relay device 110. In an example, the relay device 110 may identify the quantity of empty data byte locations based on storing the set of data packets.

At 415, the relay device 110 may receive an indicator (e.g., a pause frame or a transmission command) associated with transmitting data packets. In some examples, the relay device 110 may transmit at least a subset of the set of data packets over a communication medium based on the indicator (e.g., a transmission command). In some aspects, the relay device 110 may identify the quantity of empty data byte locations based on transmitting at least the subset of the set of data packets.

At 416, the relay device 110 may identify the state of a state machine (e.g., pause FSM 160) included in the relay device 110. In some aspects, the state of the state machine may be based on the indicator.

In an example, the communication medium may include a physical medium electrically coupling the relay device 110 and a first device of at least two other devices. In some examples, the at least two other devices may include a host device and a peer device. In an example, the first device may be the peer device. In some cases, the relay device 110 may determine a size of the data buffer based on one or more of: an interface bandwidth associated with the communication medium; a distance between the device and the first device; and a transmission speed associated with the communication medium.

In some aspects, the relay device 110 may pause or enable the lossless flow of data based on the quantity of empty data byte locations compared to a threshold. In some other aspects, the relay device 110 may pause or enable the lossless flow of data based on the state of the state machine. For example, at 420-a, the relay device 110 may compare the quantity of empty data byte locations to a threshold. In another example, at 420-b, the relay device 110 may determine whether the state machine is in a pause state or an unpause state.

In an example, at 425, the relay device 110 may pause a lossless flow of data between the relay device 110 and the at least two other devices (e.g., host device and peer device).

In some examples, the relay device 110 may pause the lossless flow of data based on the quantity of empty data byte locations being below a threshold, the state of the state machine (e.g., a pause state), or both.

At 430, the relay device 110 may transmit a pause request based on the quantity of empty data byte locations being below a threshold, the state of the state machine (e.g., a pause state), or both. In some examples, the pause request, the indicator (e.g., a pause frame), or both may include a control frame.

In some aspects, the relay device 110 may pause the lossless flow of data based on the quantity of empty data byte locations identified at 410, regardless of the state of the state machine. In some other aspects, the relay device 110 may pause the lossless flow of data based on a first state associated with the state machine.

Alternatively, or additionally, at 435, the relay device 110 may enable the lossless flow of data between the relay device 110 and the at least two other devices (e.g., host device and peer device). In some examples, the relay device 110 may enable the lossless flow of data based on the quantity of empty data byte locations exceeding the threshold, the state of the state machine (e.g., an unpause state), or both.

At 440, the relay device 110 may transmit an enable request based on the quantity of empty data byte locations exceeding a threshold, the state of the state machine (e.g., an unpause state), or both. In some examples, the enable request, the indicator (e.g., a transmission command), or both may include a control frame.

In some aspects, the relay device 110 may enable the lossless flow of data based on the quantity of empty data byte locations identified at 410, regardless of the state of the state machine. In some other aspects, the relay device 110 may enable the lossless flow of data based on a second state associated with the state machine.

Particular aspects of the subject matter described herein may be implemented to realize one or more advantages. The described techniques may support improvements in the packet broadcasting framework, decreased signaling overhead, reduced memory buffer size, and improved reliability, among other advantages. As such, supported techniques may include improved network operations and, in some examples, may promote network efficiencies and reduced overhead, among other benefits.

Any of the steps, functions, and operations discussed herein can be performed continuously and automatically.

The exemplary systems and methods of this disclosure have been described in relation to examples of a relay device 110, a relay device 210, and a relay device 305. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique

What is claimed is:

1. A method for flow control in a network, the method comprising:
   identifying, by a device, a quantity of empty data byte locations in a data buffer of the device;
   receiving an indicator associated with transmitting data packets, wherein the indicator comprises a control frame;
   identifying a state of a state machine included in the device, wherein the state machine enters the state based on the control frame; and
   pausing a lossless flow of data between the device and at least two other devices based at least in part on the quantity of empty data byte locations being below a threshold and the state of the state machine, wherein pausing the lossless flow of data comprises transmitting a pause request comprising the control frame to one or more of the at least two other devices.

2. The method of claim 1, further comprising:
   enabling the lossless flow of data between the device and the at least two other devices, wherein enabling the lossless flow of data is based at least in part on the quantity of empty data byte locations exceeding the threshold or the state of the state machine, or both.

3. The method of claim 2, wherein:
   pausing the lossless flow of data is based at least in part on a first state associated with the state machine; and
   enabling the lossless flow of data is based at least in part on a second state associated with the state machine.

4. The method of claim 1, further comprising:
   receiving a second indicator associated with transmitting the data packets, wherein the indicator comprises a second control frame;
   identifying a second state of the state machine, wherein the state machine enters the second state based at least in part on the second indicator; and
   enabling the lossless flow of data between the device and the at least two other devices, based at least in part on the quantity of empty data byte locations exceeding the threshold, the state of the state machine, or both, wherein enabling the lossless flow of data comprises transmitting an enable request comprising the second control frame.

5. The method of claim 1, further comprising:
   receiving a set of data packets; and
   storing the set of data packets to the data buffer, wherein identifying the quantity of empty data byte locations is based at least in part on storing the set of data packets.

6. The method of claim 5, wherein receiving the set of data packets, storing the set of data packets, or both comprises refraining from discarding one or more data packets of the set of data packets.

7. The method of claim 5, further comprising:
   transmitting at least a subset of the set of data packets over a communication medium based at least in part on the state of the state machine or a second state of the state machine,
   wherein identifying the quantity of empty data byte locations is based at least in part on transmitting at least the subset of the set of data packets.

8. The method of claim 7, wherein the communication medium comprises a physical medium electrically coupling the device and a first device of the at least two other devices.

9. The method of claim 7, further comprising:
   determining a size of the data buffer based at least in part on one or more of:
      an interface bandwidth associated with the communication medium;
      a distance between the device and the first device; and
      a transmission speed associated with the communication medium.

10. The method of claim 1, wherein the device comprises a relay device.

11. The method of claim 1, wherein the at least two other devices comprise a host device and a peer device.

12. The method of claim 1, wherein the network comprises a local area network.

13. A device comprising:
   a state machine;
   a processor;
   memory in electronic communication with the processor; and
   instructions stored in the memory, the instructions being executable by the processor to:
      identify, by the device, a quantity of empty data byte locations in a data buffer of the device;
      receive an indicator associated with transmitting data packets, wherein the indicator comprises a control frame;
      identify a state of a state machine included in the device, wherein the state machine enters the state based on the control frame; and
      pause a lossless flow of data between the device and at least two other devices based at least in part on the quantity of empty data byte locations being below a threshold and the state of the state machine, wherein pausing the lossless flow of data comprises transmitting a pause request comprising the control frame to one or more of the at least two other devices.

14. The device of claim 13, wherein the instructions are further executable by the processor to:
   enable the lossless flow of data between the device and the at least two other devices, wherein enabling the lossless flow of data is based at least in part on the quantity of empty data byte locations exceeding the threshold or the state of the state machine, or both.

15. The device of claim 14, wherein:
   pausing the lossless flow of data is based at least in part on a first state associated with the state machine; and
   enabling the lossless flow of data is based at least in part on a second state associated with the state machine.

16. A system comprising:
   a data buffer;
   a controller, wherein the controller is configured to identify a quantity of empty data byte locations in the data buffer;
   a transceiver, wherein the transceiver is configured to receive an indicator associated with transmitting data packets, wherein the indicator comprises a control frame; and
   a state machine configured to transition among a set of states based on the control frame,
   wherein the controller is further configured to pause a lossless flow of data between the data buffer and at least two devices based at least in part on the quantity of empty data byte locations being below a threshold and a state of the state machine, wherein pausing the lossless flow of data comprises transmitting a pause request comprising the control frame to one or more of the at least two other devices.

17. A relay device, comprising:
a first data interface coupled with a peer device;
a second data interface coupled with a host device;
a data buffer that stores data packets received from the host device prior to transmitting the data packets to the peer device; and
a state machine that transitions among a set of states in response to a control frame received at the relay device, wherein the relay device enables a lossless transmission of data between the host device and the peer device and transmits a pause request comprising the control frame to the host device based on utilization of the data buffer reaching a data storage capacity and the state of the state machine.

18. The relay device of claim 17, wherein the relay device receives the control frame from the peer device.

19. The relay device of claim 17, wherein the data buffer comprises a First-In-First-Out data buffer.

20. The relay device of claim 17, wherein the data packets are received at more than 400 G/sec, and wherein the data buffer comprises a capacity of no more than 50 kb.

21. The relay device of claim 20, wherein the data buffer comprises a capacity of no more than 25 kb.

22. The relay device of claim 17, wherein a data cable connects the first data interface with the peer device, and wherein a line trace connects the second data interface with the host device.

23. The relay device of claim 22, wherein the data cable is at least 5 m in length.

24. The relay device of claim 17, wherein the first data interface comprises at least one of a PCIe interface and an Ethernet interface.

25. The relay device of claim 17, wherein the relay device is further configured to transmit a start transmission command to the host device in response to the data buffer utilization falling below a predetermined threshold.

* * * * *